(12) United States Patent
Biggs et al.

(10) Patent No.: US 8,145,708 B2
(45) Date of Patent: Mar. 27, 2012

(54) ON-LINE VIRTUAL ROBOT (BOT) SECURITY AGENT

(75) Inventors: Todd S. Biggs, Kirkland, WA (US); Campbell D. Gunn, Redmond, WA (US); Michael D. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 11/558,781

(22) Filed: Nov. 10, 2006

(65) Prior Publication Data

US 2008/0114837 A1 May 15, 2008

(51) Int. Cl.
G06F 15/16 (2006.01)
G06F 15/177 (2006.01)
G06F 3/00 (2006.01)

(52) U.S. Cl. .......... 709/204; 715/736; 715/739

(58) Field of Classification Search .......... 709/204–207
See application file for complete search history.

(56) References Cited

U.S. PATENT DOCUMENTS

| 5,884,033 | A | 3/1999 | Duvall et al. |
| 7,032,007 | B2 | 4/2006 | Fellenstein et al. |
| 7,124,123 | B1 | 10/2006 | Roskind et al. |
| 2003/0105822 | A1 | 6/2003 | Gusler et al. |
| 2004/0049543 | A1 | 3/2004 | Kaminsky et al. |
| 2004/0111479 | A1 | 6/2004 | Borden et al. |
| 2004/0128552 | A1 | 7/2004 | Toomey |
| 2004/0154022 | A1 | 8/2004 | Boss et al. |
| 2005/0060167 | A1* | 3/2005 | Patron et al. .......... 705/1 |
| 2005/0091328 | A1 | 4/2005 | Saeidi |
| 2005/0149630 | A1 | 7/2005 | Smolinski et al. |
| 2006/0015563 | A1 | 1/2006 | Judge et al. |
| 2006/0036689 | A1* | 2/2006 | Buford et al. .......... 709/206 |
| 2006/0047747 | A1 | 3/2006 | Erickson et al. |
| 2006/0168060 | A1 | 7/2006 | Briand et al. |
| 2006/0184549 | A1 | 8/2006 | Rowney et al. |
| 2006/0259555 | A1* | 11/2006 | Hassounah et al. .......... 709/206 |
| 2007/0282623 | A1* | 12/2007 | Dattorro .......... 705/1 |

(Continued)

FOREIGN PATENT DOCUMENTS

EP 1677218 7/2006

(Continued)

OTHER PUBLICATIONS

"Management and Security Considerations for Instant Messaging in the Workplace", retrieved at <<http://download.microsoft.com/download/4/8/6/4867a6c9-701a-4d4a-b1c6-85d9235c2ca3/Security_Considerations_for_IM.doc#_Toc122763720>>, Microsoft Corporation, Dec. 2005, pp. 14.

(Continued)

Primary Examiner — Ashok Patel
Assistant Examiner — Evans Desrosiers
(74) Attorney, Agent, or Firm — Lee & Hayes, PLLC

(57) ABSTRACT

Various embodiments can provide a virtual online robot (bot) or security agent. The agent or guardian can monitor on line conversations and can act to intervene in an event a conversation's content meets certain definable criteria that indicates that the content might be inappropriate or possibly harmful or risky. In at least some embodiments, the agent or guardian is configured to utilize natural language processing techniques to evaluate the context of a conversation across its span and/or conversations across individual users. Using natural language processing techniques, the agent or guardian can then present notifications or warnings to individual users (or others) when a particular conversation or portion thereof is deemed problematic.

11 Claims, 7 Drawing Sheets

U.S. PATENT DOCUMENTS

2008/0168095 A1* 7/2008 Larcombe et al. ......... 707/104.1

FOREIGN PATENT DOCUMENTS

| WO | W003058464 | 7/2003 |
| WO | W02006094335 A1 | 9/2006 |

OTHER PUBLICATIONS

"Phishing Attacks: Keeping Employees (and the Enterprise) Off the Hook", retrieved at <<http://www.8e6.com/docs/PhishingWhitePaper.pdf>>, 8e6 Technologies, 2005, pp. 1-6.

"Vericept Filter", retrieved on Sep. 1, 2006, at <<http://72.14.207.104/search?q=cache:7xnM2Dy31RcJ:www.siminc.com/New/pdfs/Vericept_Filter_SIM.pdf+chat+filter+confidential&hl=en&gl=in&ct=clnk&cd=16>>, pp. 1-4.

Australian Office Action mailed Jun. 28, 2011 for Australian patent application No. 2007345184, a counterpart foreign application of U.S. Appl. No. 11/558,781, 3 pages.

Russian Office Action mailed May 31, 2011 for Russian patent application No. 2009117673, a countperpart foreign application of U.S. Appl. No. 11/558,781, 5 pages.

Notice of Allowance of RU Application 2009117673, mailed Sep. 22, 2011, related to U.S. Appl. No. 11/558,781, 9 pages.

* cited by examiner

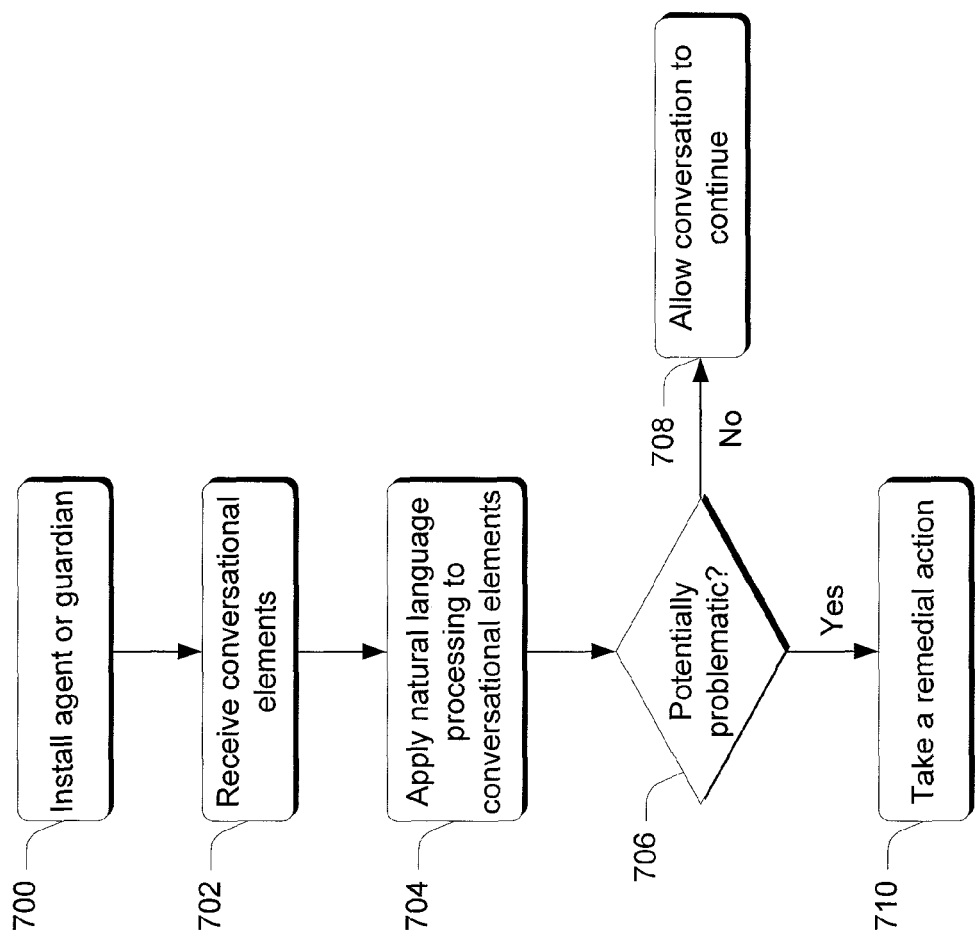

ON-LINE VIRTUAL ROBOT (BOT) SECURITY AGENT

BACKGROUND

Today, privacy and security are increasingly important as people interact more extensively and frequently with networked computer resources, such as those available over the Internet. For example, it is not unusual for a person to enter into a real time dialog with another person (or some other entity such as a bot) over the Internet. This dialog might be spawned by the person receiving an invitation to converse, such as those that are typically received in the instant messaging context, or through some other context, such as by visiting a web site or engaging a gadget on a web site.

Many times, mitigation of any privacy or security issue ends with the acceptance of an invitation to converse or entry into a conversation or dialog. That is, a user is free to enter into a conversation or not. Once in the conversation, often times, the user is unprotected from nefarious activities such as phishing attempts or, worse yet, activities that place their personal security at risk. As an example, consider the dialog just below in which User A—a user in need of protection—is in an online conversation with an unknown User B:

A: Hi
B: Hi, what's your social security number?
Or consider the following conversation:
A: Hi, who are you?
B: My name's Bill—where do you live?
A: Redmond
B: What street?
A: 111$^{th}$ Ave. NE
B: Cool—I might live near you—what's your house number?

As these dialogs indicate, users can very easily enter into conversations which can turn malicious. Compounding this is the fact that some users, such as children and minors, may be more prone to trust people or entities that they meet online—thus, increasing the risk of their unwitting exposure to nefarious activities.

SUMMARY

The various embodiments described below can provide a virtual online robot (bot) or security agent. The agent, also termed a "guardian", can monitor on line conversations and can act to intervene in an event a conversation's content meets certain definable criteria that indicates that the content might be inappropriate or possibly harmful or risky. In at least one illustrated and described embodiment, the agent or guardian is configured to utilize natural language processing techniques to evaluate the context of a conversation across its span and/or conversations across individual users. Using natural language processing techniques, the agent or guardian can then present notifications or warnings to individual users (or others) when a particular conversation or portion thereof is deemed problematic.

In at least some embodiments, the agent or guardian can learn over time and develop a knowledge base that allows it to dynamically adapt to new and different scenarios.

BRIEF DESCRIPTION OF THE DRAWINGS

FIG. 7 is a flow diagram that illustrates steps in a method in accordance with one embodiment.

DETAILED DESCRIPTION

Overview

Figure 1:
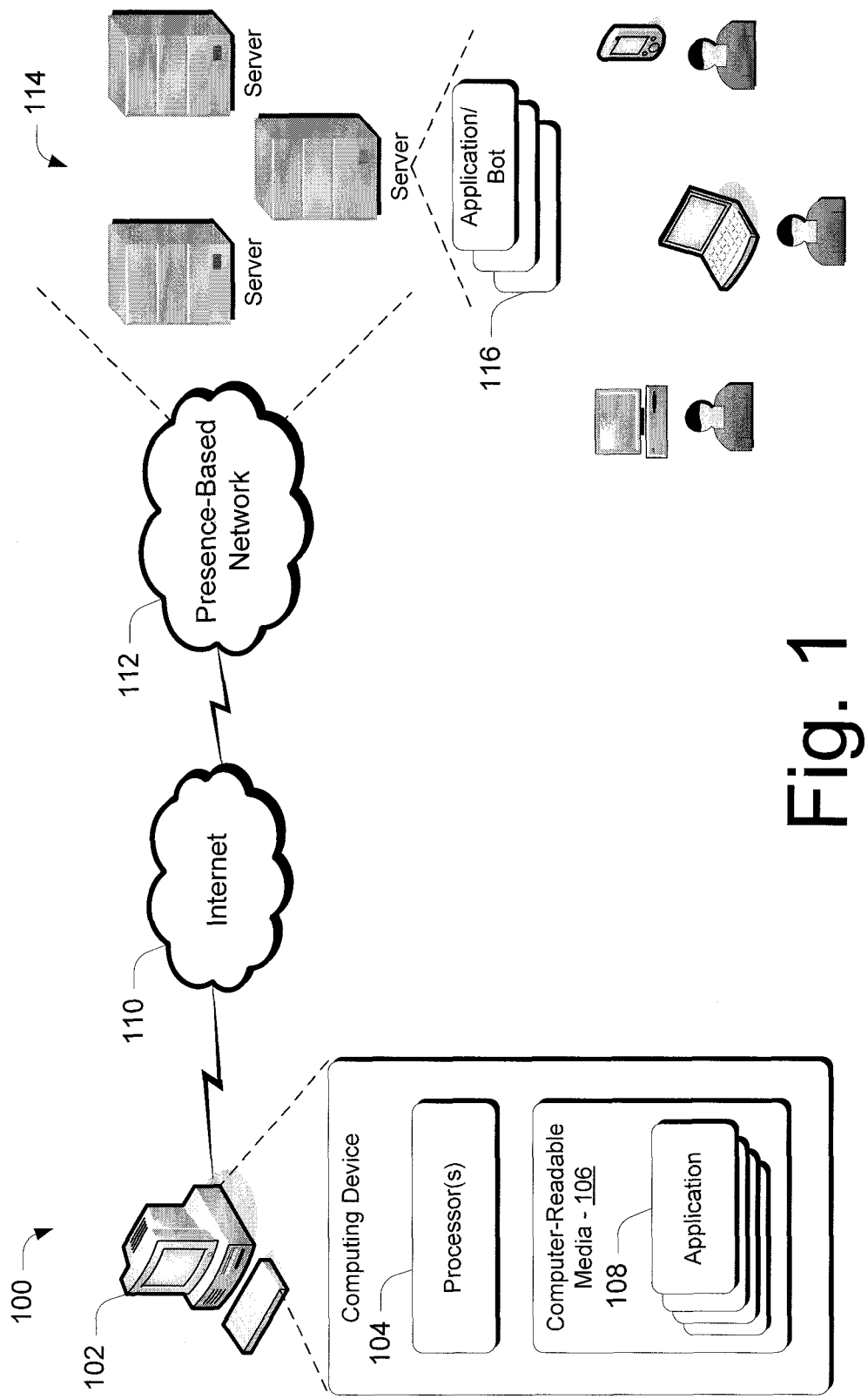
FIG. 1 illustrates a system that includes a presence-based network in accordance with one embodiment.

The various embodiments described below can provide a virtual online robot (bot) or security agent. The agent, also termed a "guardian", can monitor on line conversations and can act to intervene in an event a conversation's content meets certain definable criteria that indicates that the content might be inappropriate or possibly harmful or risky. In the embodiments described below, the agent or guardian can be implemented at different locations in a system in which online communication can take place. For example, in some embodiments, the agent or guardian can be implemented locally, as part of the software executing on an end user's computing device. In this context, the agent or guardian can comprise part of an application that facilitates two-way communication—such as an instant messaging application, mobile short text messaging exchanges, or can comprise a software component that can be utilized by other applications. Alternately or additionally, the agent or guardian may constitute a proxy component that resides on a network to proxy communication between entities. Alternately or additionally, the agent or guardian may comprise part of a server that performs monitoring and evaluation on behalf of individual users.

In at least one illustrated and described embodiment, the agent or guardian is configured to utilize natural language processing techniques to evaluate the context of a conversation across its span and/or conversations across individual users. Using natural language processing techniques, the agent or guardian can then present notifications or warnings to individual users (or others) when a particular conversation or portion thereof is deemed problematic. Such warnings can appear prior to messages being sent, or inline with the communication as appropriate. Alternately or additionally, the agent or guardian can block or otherwise prevent portions of conversations that it deems problematic.

In at least some embodiments, the agent or guardian can learn over time and develop a knowledge base that allows it to dynamically adapt to new and different scenarios. For example, the agent or guardian can learn across a single user's interactions, a group of users or across all users on a network.

It is to be appreciated and understood that the methods and techniques described herein can be utilized in any context in which a user enters into a conversation with another—whether another person or a bot. Such conversations can be textual or voice conversations, such as those that can take place using an instant messaging application, web browser, text messaging, VoIP application and the like.

However, to provide some tangible context for the reader, the embodiments described below are described in the context of a so-called presence-based application or network in which a user can interact with others—either humans or applications in the form of bots. The presence-based application that is described an instant messaging application.

In the discussion that follows, the notion of a presence-based network is first described to provide the reader who is unfamiliar with such networks and associated presence-based applications some context for appreciating the described embodiments. Following this, a discussion of the inventive embodiments in the context of a presence-based network is provided.

Presence in General

The notion of presence typically implies the use of a server or service that runs and keeps online users updated with each other's contacts' online status. That is, in a presence-based network, users can identify so-called contacts—the same or similar to those that appear in the user's email address list. Whenever a contact is online, the presence-based network notifies the user so that the user can leverage the services provided by the network—such as instant messaging, peer-to-peer file exchange and the like. That is, the presence-based network can enable contacts that are online together to communicate in a real-time fashion.

One commercially-available software product that provides presence capabilities is Microsoft's Windows® Messenger or Microsoft Windows® Live Messenger, although other products are available and can certainly be used in connection with the concepts described in this document. Microsoft's Windows® Messenger is a rich, integrated real-time communications experience in Windows® XP that enables people to effortlessly see, talk, work and play with friends, family and colleagues, whenever and however they choose using their personal computer. Windows® Messenger also includes presence and notification features to keep users updated when their contacts are online and let users know their current status.

Various embodiments described below can leverage the functionality provided by a presence-based network. It is to be appreciated and understood that Microsoft's Windows® Messenger constitutes but one exemplary application that can be utilized in this context. As such, other applications can be utilized without departing from the spirit and scope of the claimed subject matter. Such other applications may or may not be presence-based.

Exemplary Presence-Based Network

As an example of a presence-based network in accordance with one embodiment, consider FIG. 1 which illustrates such a network or system generally at 100. System 100 includes one or more computing devices 102 each of which includes one or more processors 104, one or more computer-readable media 106 and one or more applications 108 that reside on the computer-readable media and which are executable by the processor(s). In at least one embodiment, one of the applications resides in the form of an instant messaging application, such as Microsoft's Windows® Messenger. In at least some embodiments, computer-readable media 106 can include applications, other than presence-based applications, that can implement the embodiments described herein. Such other applications can include, by way of example and not limitation, web browsers, applets, web or desktop based gadgets, mobile applications, computer games and the like.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

System 100 also includes a network, such as the Internet 110 that is used by computing device 102 to communicate with a presence-based network 112. Any suitable protocols can be utilized to enable communication between computing device 102 and presence-based network 112.

As shown, presence-based network 112 includes one or more servers 114 that implement the presence environment, as will be appreciated by the skilled artisan. The presence-based network can be one that includes or supports the use of instant messaging, VoIP, voice clips and the like—all of which can permit a user of computing device 102 to communicate with the network and other users of the network such as humans and bots. Instant messaging, VoIP and voice clip protocols will be understood by the skilled artisan and, for the sake of brevity, are not further described here.

In at least some embodiments, the presence-based network includes one or more applications or bots 116, typically hosted by or on a server 114, which can communicate with a user of computing device 102 (through any suitable means such as instant messaging, email, VoIP, voice clips and the like). The network also includes other human users that can communicate with the user of computing device 102 using any of a variety of computing device as indicated.

In practice, when a user in a presence-based network enters into a conversation with another, some type of a user interface is presented to the user through which the conversation can take place.

Figure 2:
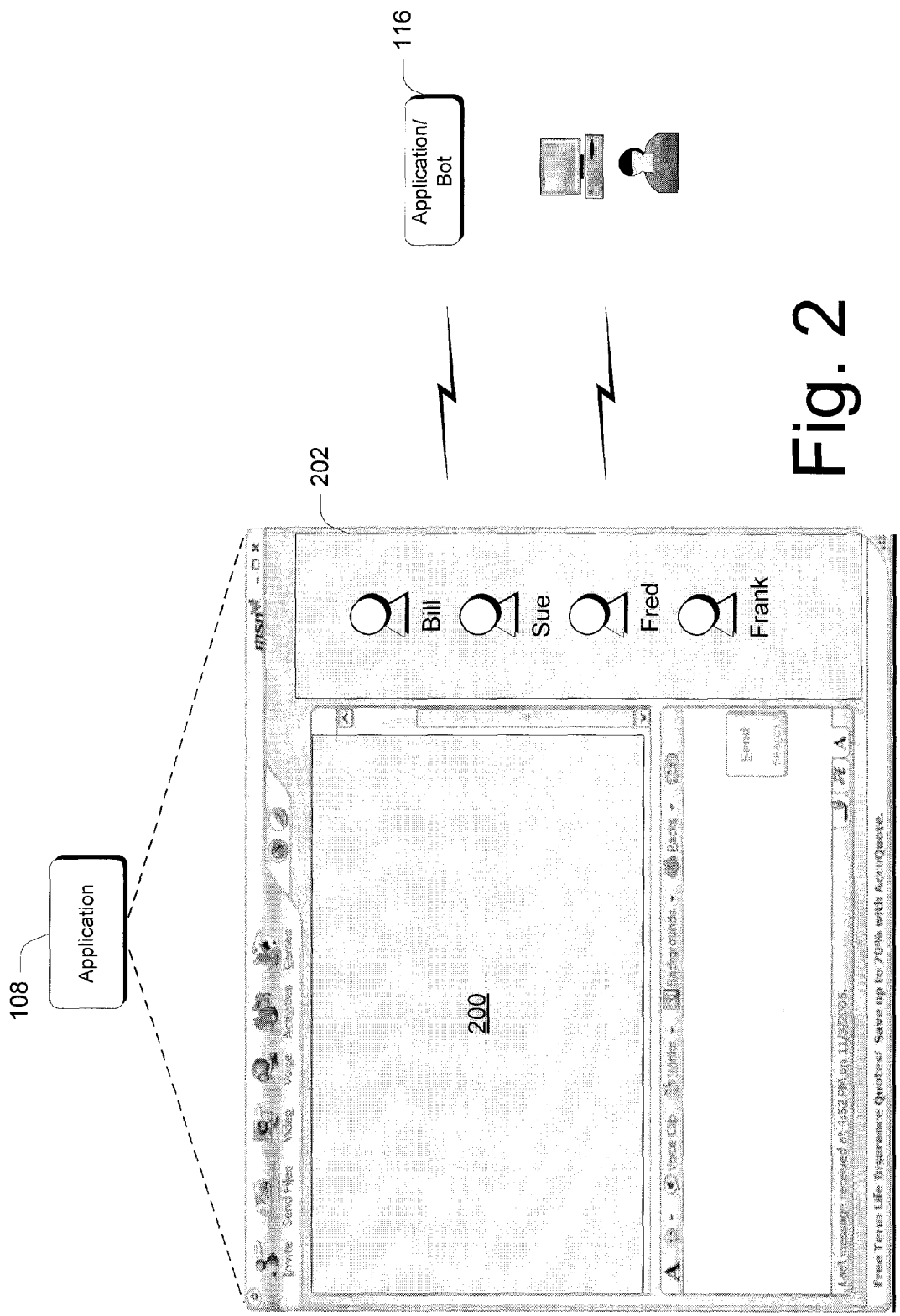
FIG. 2 illustrates an exemplary application in the form of an instant messaging application that exposes a conversation window in accordance with one embodiment.

As but one example, consider FIG. 2 which illustrates, from FIG. 1, an application 108 in the form of an instant messaging application, one application/bot 116 and one human user. Here, instant messaging application 108 presents, on a user's computing device, a user interface that includes a so-called conversation window 200 which permits the user to have conversations with various contacts or others that are online. In addition, application 108 provides a contact list 202 that lists the various contacts of a user who happen to be on line at the present time. Thus, in this example, Bill, Sue, Fred and Frank are currently on line and the user may choose to initiate a conversation with any or all of them.

Notice in this example that all of the user's contacts appear to be humans. There may be situations when, however, a user's contact or, more generally, an entity with whom the user interacts or communicates is not, in fact, a human being but rather, is a bot.

For example, assume that the user browses to a travel-related site and, by clicking a particular link, accesses information to enable them to plan a trip. By clicking the link, the user's instant messaging application is launched (or some other application communicatively linked with the presence-based network that permits conversation) and the user suddenly finds themselves in a "conversation" with travel agent "Joe Johnson". While Joe may appear human in many respects insofar as having a presence persona and being able to field and respond to questions in an intelligent way, the user may have no idea that "Joe Johnson" is actually bot. Further, the user may have no idea as to whether the bot is a legitimate bot—such as one that is legitimately associated with the travel site, or one that has other nefarious purposes in mind.

In the embodiments described below, an agent or guardian is provided that monitors and evaluates a user's conversations—whether those conversations are with other humans and/or bots—and takes remedial measures in an event a conversation or portions of its content are deemed problematic or possibly harmful.

Exemplary Embodiments

Figure 3:
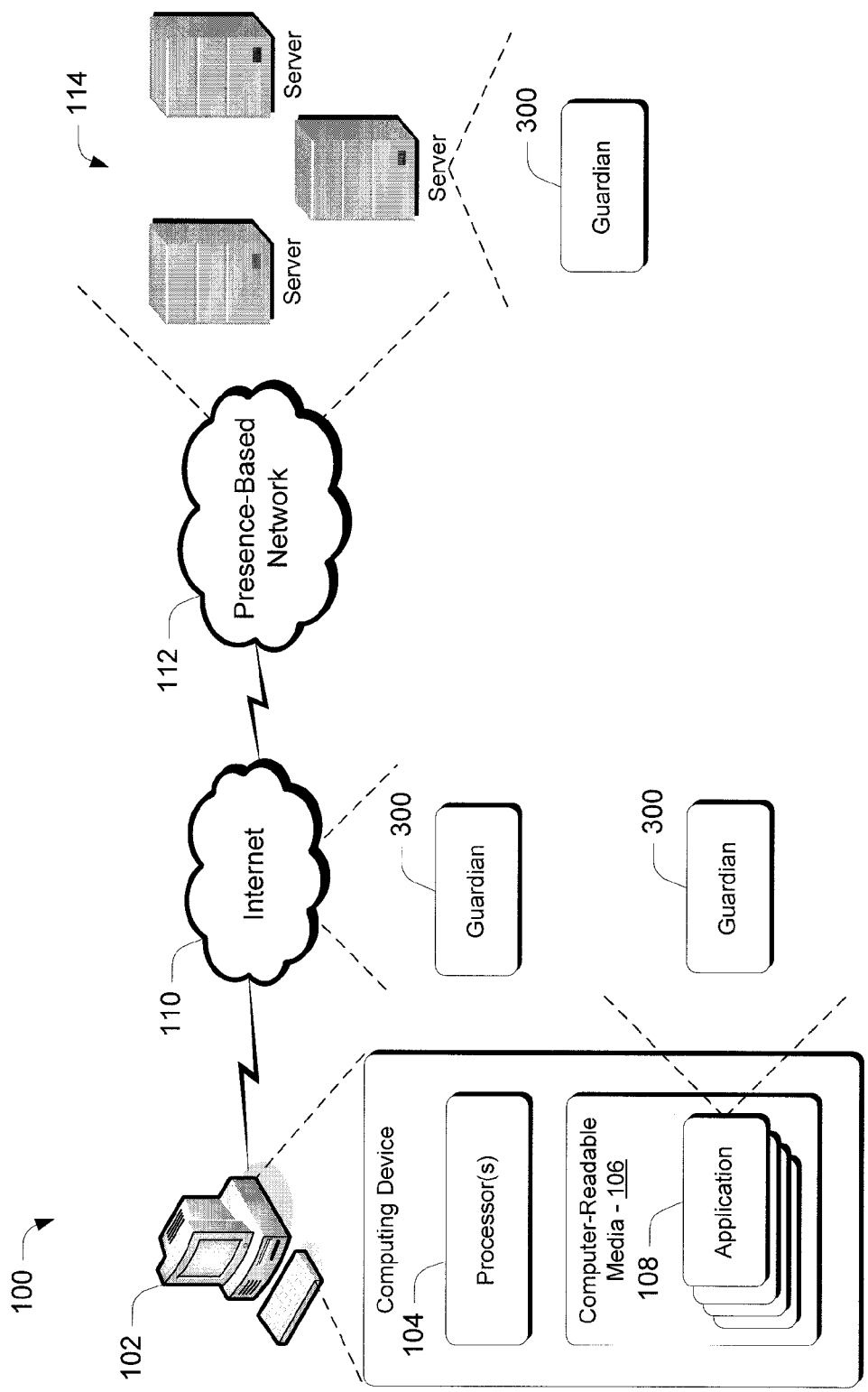
FIG. 3 illustrates a system that includes one or more guardians in a presence-based network in accordance with one embodiment.

FIG. 3 illustrates an exemplary system in accordance with one embodiment and includes components that are the same as or similar to components that were described in connection with FIG. 1. Accordingly, for the sake of brevity, the description of those components is not repeated here.

Notice, however, that in this embodiment, guardian components 300 are provided. As discussed above, the guardian component can reside at different locations with system 100. For example, a guardian component 300 can reside locally on the end user's computing device. In this context, the guardian component can comprise part of an application, such as an instant messaging application, or can reside as a standalone component that can be used or leveraged by other components. Alternately or additionally, guardian component 300 can reside on or otherwise be accessible via a network such as the Internet. Here, the guardian component would serve as a proxy between conversation participants. Alternately or additionally, guardian component 300 can be provided or otherwise accessed through the presence-based network.

Figure 4:
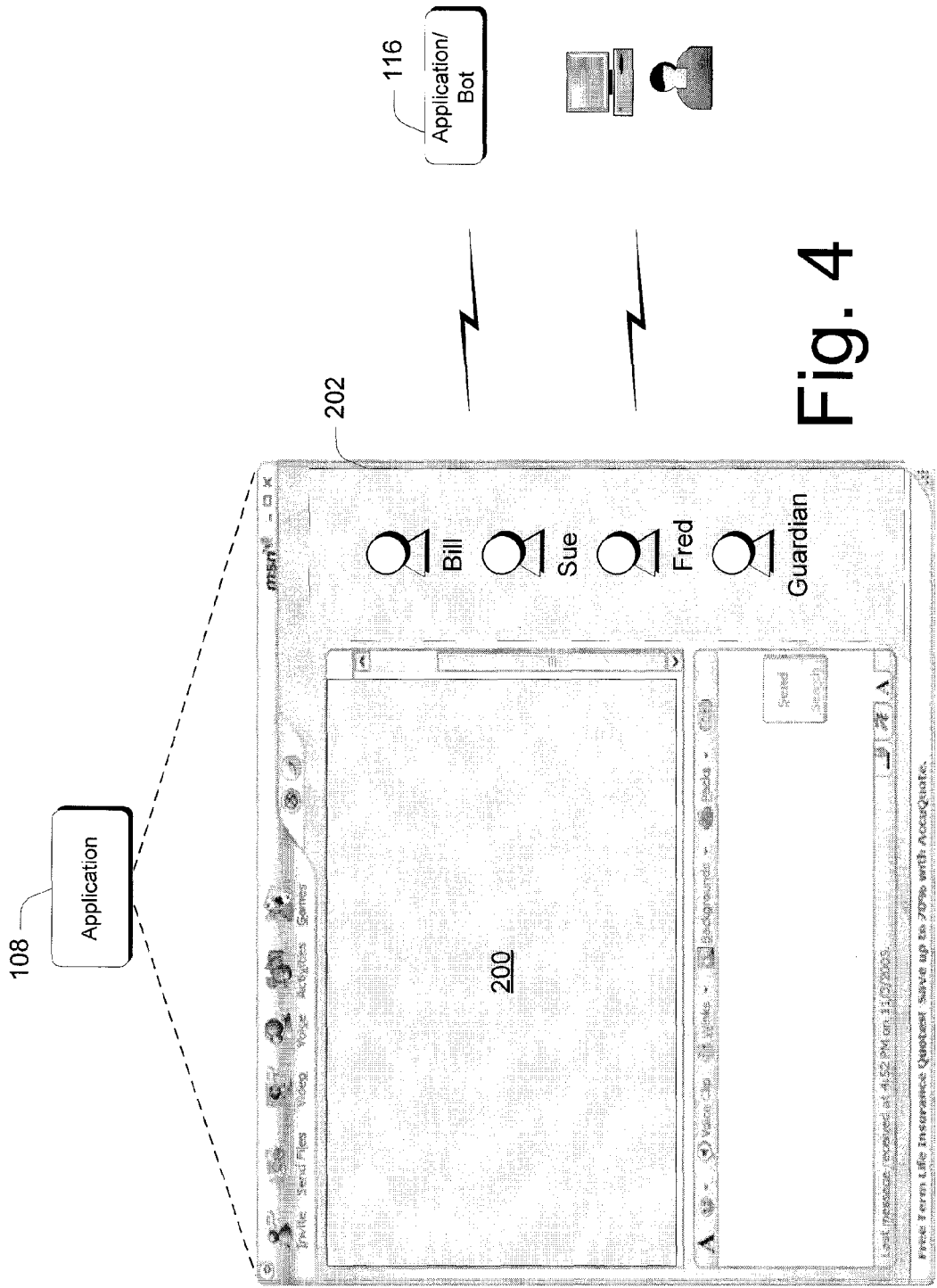
FIG. 4 illustrates an exemplary user interface in accordance with one embodiment.

In embodiments in which the guardian component is implemented in connection with an instant messaging application, the guardian component can appear as a contact in a user interface. For example, FIG. 4 illustrates an exemplary user interface in which a guardian appears in the user's contact list. This lets the user know that their conversations are being monitored and protected by the guardian.

In the discussion below, characteristics and properties of an exemplary guardian component are described. It is to be appreciated and understood that this description constitutes but one exemplary guardian component. As such, other a guardian components can be utilized without departing from the spirit and scope of the claimed subject matter.

Exemplary Guardian Component

Figure 5:
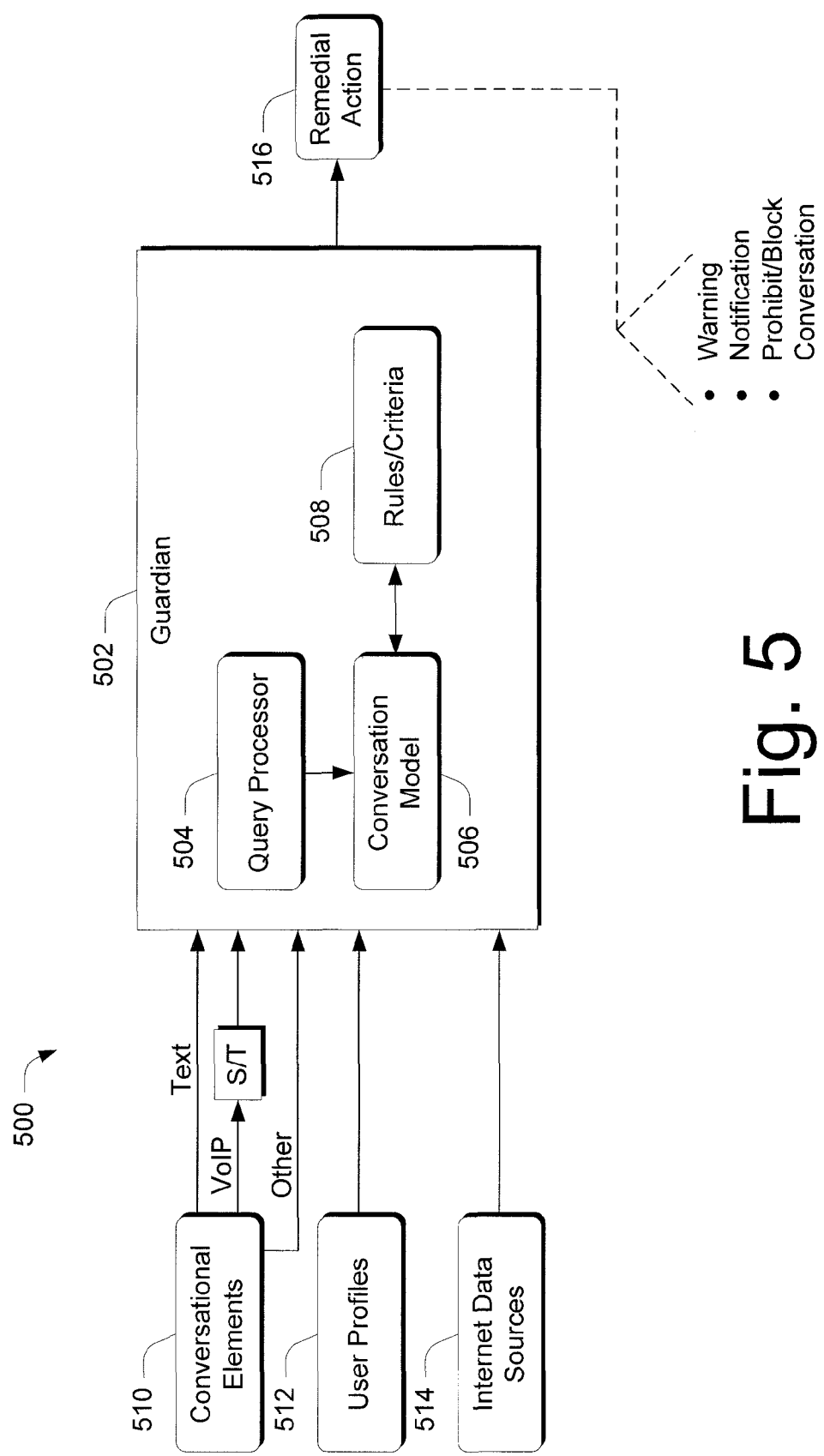
FIG. 5 illustrates an exemplary guardian in accordance with one embodiment.

FIG. 5 illustrates an exemplary system, generally at 500, that includes a guardian component 502 in accordance with one embodiment. In the illustrated and described embodiment, the guardian component is implemented in software in the form of computer-readable instructions that reside on some type of computer-readable media, such as ROM, RAM, a hard disk, flash and the like. Further, while the guardian component is illustrated as including certain components described below, it is to be appreciated and understood that those components (or ones similar to or different from those depicted) might reside outside of the guardian component and may be used or called to implement the functionality described above and below. Further, it should be noted that the guardian component may reside at different locations within the system of which it comprises a part, as has been described above.

In the illustrated and described embodiment, the agent or guardian is configured to utilize natural language processing techniques to evaluate the context of a conversation across its span and/or conversations across individual users. Using natural language processing techniques, the agent or guardian can then present notifications or warnings to individual users (or others) when a particular conversation or portion thereof is deemed problematic. Alternately or additionally, the agent or guardian can block or otherwise prevent display of portions of conversations that it deems problematic. As an intermediate between these two approaches, the guardian can prompt a warning asking the user to verify that a particular communication should proceed, and wait for the affirmative before sending the user's response. Natural language processing techniques are known and will be readily appreciated by the skilled artisan. Accordingly, for the sake of brevity, such techniques are not described herein.

In the illustrated and described embodiment, guardian 502 includes or otherwise makes use of a query processor 504, a conversation model 506 and a rules/criteria component 508.

The query processor 504 is part of the natural language processing system and typically operates upon an input, such as a text string, to parse the input and build, from the parsed input, a conversation model, such as conversation model 506. Any suitable query processor can be utilized.

Conversation model 506 is then evaluated in view of the rules/criteria component 508 to ascertain whether a conversation or portions thereof need to be further addressed. The rules/criteria component constitutes a knowledge base of information that describes the rules and criteria by which conversations are evaluated. The rules and criteria can be expressed in any suitable manner and using any suitable language. As but one example, the rules and criteria can be expressed in XML which, in turn, provides a flexible and convenient degree of extensibility and adaptability by which the guardian can be extended. Specifically, such extensibility can support such things as cumulative learning over time and incorporation of new and/or different rules and criteria.

In the illustrated and described embodiment, guardian 502 is configured to receive different types of inputs. In the illustrated and described example, guardian 502 can receive, as inputs, conversational elements 510, user profiles 512 and/or internet data sources 514.

Conversational elements 510 can include any suitable types of conversational elements. In this example, the conversational elements can include text as well as other conversational elements. Specifically, in this example the conversational elements can include VoIP (Voice over IP) inputs which can be processed by a suitably configured speech-to-text processor which may or may not comprise a part of the guardian. The conversation elements are those elements that are generated by users or participants during an online dialog.

User profiles 512 include various user profiles which, in turn, include parameters and constraints that can be used by the rules/criteria component 508 to set up rules and criteria that are to be used in connection with certain users. For example, through the use of user profiles, parents can set up parental controls that are then used to evaluate conversations. Other user profiles can be used as well.

Internet data sources 514 can include input that comes from various internet data sources. Here, these data sources can include any suitable input.

Having received the input and processed the input as described above, guardian 502 can operate upon the input to produce, if appropriate, one or more remedial actions 516. The remedial actions produced by guardian 502 can include any suitable remedial actions. By way of example and not limitation, such remedial actions may include generating warnings (such as audible and/or visible), notifying other third parties or third party services, and/or prohibiting or blocking the conversation, conversation portions or the entity with which the protected party is conversing.

Figure 6:
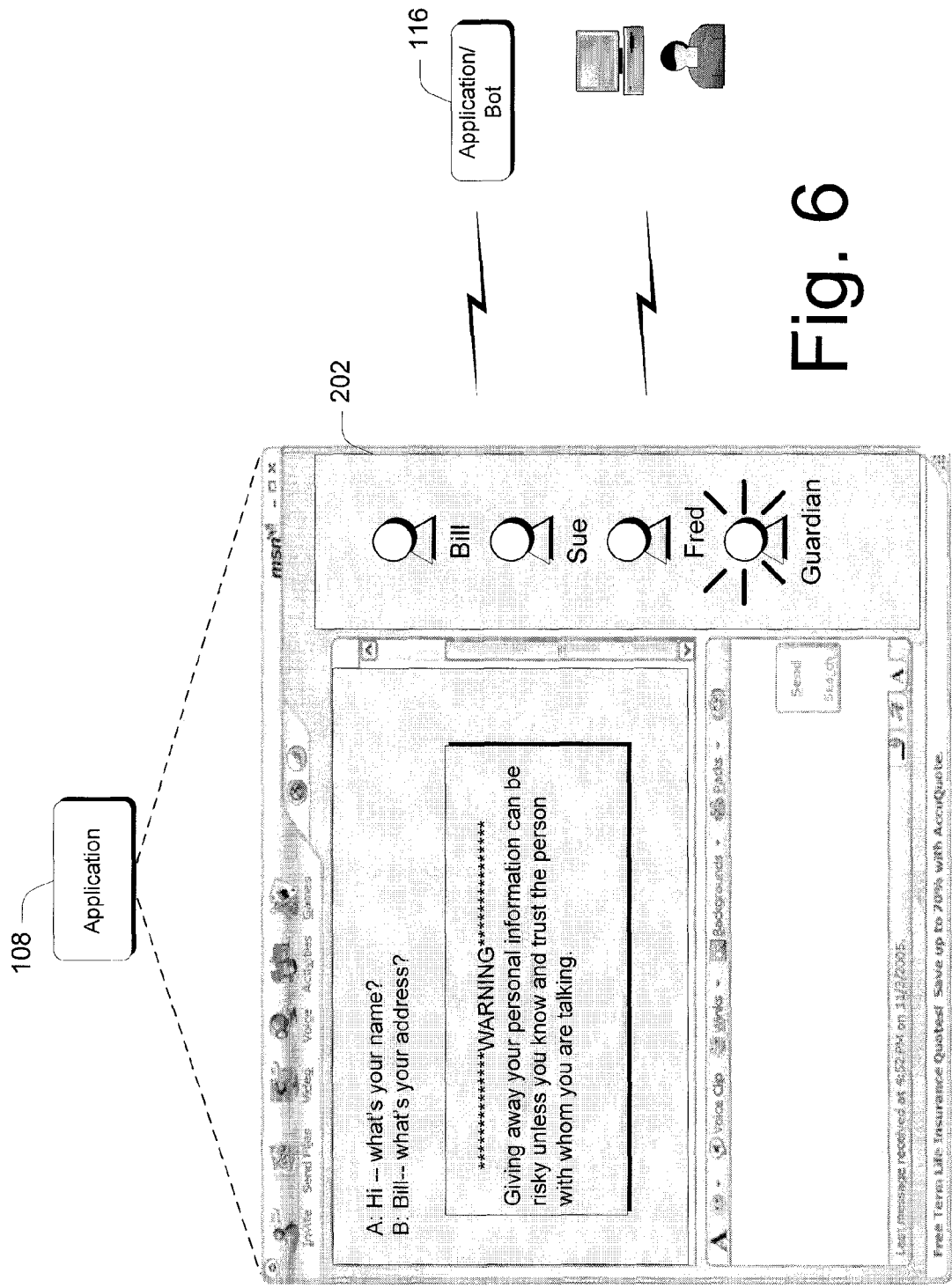
FIG. 6 illustrates an exemplary user interface in accordance with one embodiment.

FIG. 6 illustrates an exemplary user interface in which a protected user (User A) is having a conversation with another user (User B). Here, user B has asked for some personal information—user A's address. Notice in this example that two different warnings have been generated for user A. First, the guardian icon has began to flash, thus alerting user A of a potential threat. Second, a dialog is presented adjacent the conversation text which warns the user of the potential risk of disclosing personal information. Of course, these two warnings constitute but examples of warnings that can be generated. Other warnings can be generated without departing from the spirit and scope of the claimed subject matter.

In the embodiments discussed above, the agent or guardian is employed in the context of a presence-based network and, more particularly, an instant messaging application. It is to be appreciated and understood that the agent or guardian can be employed in connection with other networks and/or applications, such as web browsers and the like. In addition, the agent or guardian can be manifest in any suitable way. For example, in the instant messaging context, the agent or guardian is manifest as an icon that appears in a contact list. In other contexts outside of the instant messaging context, the agent or guardian can be manifest through some other visual and/or audible manner. For example, a notification could be surfaced as part of the application's user interface (e.g. a red light flashes and/or an audible beep sounds when the guardian encounters a problematic conversation).

Further, in at least some embodiments, problematic conversation elements might not be displayed to the user at all. Rather, before a conversation element is displayed for the user, it can be processed and if found to be problematic, it can be removed and the user can be notified of the same.

In addition, in at least some embodiments, the guardian or agent can be extendible. For example, guardians or agents that are employed in schools might be extended by governmental agencies to extend to cover scenarios that are not covered by the standard agent or guardian. Extensions can be downloaded and installed over any suitable network.

Further, in at least some embodiments, an agent or guardian can be automatically added to monitor particular users when, for example, the user might be under a certain age. For example, when children under 16 create a contact list on their instant messaging client, a non-delete-able agent or guardian could be automatically added to their contact list to ensure that they are protected throughout their conversations in whatever forum those conversations take place.

Exemplary Method

FIG. 7 is a flow diagram that describes steps in a method in accordance with one embodiment. The method can be implemented in connection with any suitable hardware, software, firmware or combination thereof. In but one embodiment, the method can be implemented in software.

Step 700 installs an agent or guardian. This step can be performed in any suitable way. For example, an agent or guardian can be installed on a local user's machine, at a network location to serve as a proxy, and/or as part of a presence-based network, such as one that is utilized to implement an instant messaging environment. Step 702 receives conversational elements. This step is performed by the agent or guardian and can be performed in any suitable way and with any suitable conversational elements. For example, as noted above, such conversational elements can include textual elements, as well as other elements such as VoIP elements and the like.

Step 704 applies natural language processing to the conversation elements. But one example of how this can be done is provided above. It is to be appreciated and understood that a wide variety of natural language processing can be applied, which will be understood by those of skill in the art. Step 706 ascertains, responsive to applying the natural language processing, whether a conversation appears to be potentially problematic. A conversation can appear to be potentially problematic for a number of reasons. For example, during the course of a conversation, a person may be asked to divulge personal information, such as their address, social security number and the like. In addition, there may be instances where the language used is inappropriate for the age group of the other user. Further, there may be instances where a person is asked to accept a file or initiate some kind of activity that would be inappropriate. In instances that are legitimate—such as providing an address to make an online purchase—the conversation is not problematic. In instances where a nefarious web site holds itself out as a legitimate online purchasing site, this conversation is potentially problematic.

Alternately or additionally, a conversation may be problematic because, over its course, it moves in a direction that is inappropriate for a particular user. For example, a conversation with or between minors may become problematic because its subject matter becomes lewd or lascivious.

If a conversation does not appear to be potentially problematic, then step 708 allows the conversation to continue. If, on the other hand, the conversation appears to be potentially problematic, then step 710 takes one or more remedial actions. Examples of remedial actions are provided above.

Conclusion

Various embodiments can provide a virtual online robot (bot) or security agent. The agent or guardian can monitor on line conversations and can act to intervene in an event a conversation's content meets certain definable criteria that indicates that the content might be inappropriate or possibly harmful or risky. In at least some embodiments, the agent or guardian is configured to utilize natural language processing techniques to evaluate the context of a conversation across its span and/or conversations across individual users. Using natural language processing techniques, the agent or guardian can then present notifications or warnings to individual users (or others) when a particular conversation or portion thereof is deemed problematic.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer memory embodying computer-readable instructions which, when executed by one or more processors, cause the one or more processors to implement operations comprising:

providing a guardian component configured to use natural language processing techniques to monitor and evaluate online conversations, wherein the providing is performed via a presence-based network in which the guardian component serves as a proxy between conversation participants using an instant messaging application and the guardian component is:

a visually displayable contact icon in a contact list that includes online contacts for a user of the instant messaging application;

configured to provide a first visual indicator, associated with the displayed contact icon, that alerts a user of the instant messaging application of potential risk; and configured to provide a second visual indicator that presents a textual dialogue warning to the user of the instant messaging application of the potential risk;

monitoring, with the guardian component, one or more of the online conversations for a group of users in accordance with a criteria, wherein the guardian component is configured to extend and adapt the criteria over time to establish new rules that govern new problematic scenarios learned based on interactions in the one or more online conversations; and implementing one or more remedial actions employing the first visual indicator and the second visual indicator in an event that a monitored online conversation is determined to be problematic, wherein the monitored online conversation is determined to be problematic when at least one of:
personal information is disclosed;
inappropriate language is communicated; or an electronic file is exchanged.

2. The one or more computer memory of claim 1, wherein the act of providing is performed on an end-user's computing device.

3. The one or more computer memory of claim 1, wherein the act of providing is performed by providing the guardian component through the presence-based network.

4. The one or more computer memory of claim 1, wherein said act of monitoring includes monitoring and evaluating an online conversation across its span.

5. The one or more computer-memory of claim 1, wherein the guardian component is a non-deletable contact based on an age of the participant.

6. The one or more computer memory of claim 1, wherein the first visual indicator includes flashing the guardian component contact icon and the second visual indicator is presented within a textual conversation window of the instant messaging application.

7. A computer-implemented method comprising:
presenting a user interface that can enable a user to converse within an instant messaging application, the user interface including a guardian component configured to use natural language processing techniques to monitor and evaluate online conversations performed via a presence-based network in which the guardian component serves as a proxy between conversation participants using the instant messaging application and warns the user of threats within the instant messaging conversations;
receiving conversational elements that pertain to a particular conversation that the user is having via the user interface;
applying the natural language processing to the conversational elements to identify conversation portions that are problematic in accordance with a criteria, wherein the criteria is extensible and adaptable over time configured to establish new rules that govern new problematic scenarios learned based on the conversational elements; and
when a conversation portion is determined to be problematic, taking one or more remedial actions that implement the first visual indicator and the second visual indicator, wherein the conversation portion is determined to be problematic when at least one of:
personal information is disclosed;
inappropriate language is communicated; or
an electronic file is exchanged.

8. The method of claim 7, wherein the act of taking one or more remedial actions further includes communicating an audible warning.

9. The method of claim 7, wherein the first visual indicator includes flashing the guardian component contact icon and the second visual indicator is presented within a text window comprising the conversation elements.

10. One or more computer memory storing instructions which, when executed by one or more processors, implement an instant messaging (IM) application that uses natural language processing techniques to:
employ a guardian component configured to use natural language processing techniques to monitor IM conversations between a user and a group of contacts performed via a presence-based network in which the guardian component serves as a proxy between conversation participants using the IM application;
determine when the IM conversations are problematic in accordance with a set of rules;
visually display the guardian component as a contact icon in a contact list that includes online contacts of the user in the IM application, the guarding component being further configured to:
provide a first visual indicator, associated with the displayed contact icon, that alerts the user of problematic scenarios within IM conversations; and
provide a second visual indicator that presents a textual dialogue warning to the user of the problematic scenarios within the IM conversations;
learn from the problematic IM conversations to dynamically extend and adapt over time the set of new rules to account for new problematic scenarios; and
in an event an IM conversation is determined to be problematic, implementing the first visual indicator and the second visual indicator, wherein the IM conversation is determined to be problematic when at least one of:
personal information is disclosed;
inappropriate language is communicated; or
an electronic file is exchanged.

11. The one or more computer memory of claim 10, wherein the first visual indicator includes flashing the guardian component contact icon and the second visual indicator is presented within a textual conversation window of the IM application.

* * * * *